(12) United States Patent
Allen et al.

(10) Patent No.: US 7,444,056 B2
(45) Date of Patent: Oct. 28, 2008

(54) OPTICAL NETWORK ARCHITECTURE AND TERMINALS FOR USE IN SUCH NETWORKS

(75) Inventors: Barry Allen, Siler City, NC (US); David J. Braga, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 198 days.

(21) Appl. No.: 11/254,899

(22) Filed: Oct. 20, 2005

(65) Prior Publication Data

US 2006/0269208 A1    Nov. 30, 2006

Related U.S. Application Data

(60) Provisional application No. 60/685,975, filed on May 31, 2005, provisional application No. 60/702,146, filed on Jul. 25, 2005.

(51) Int. Cl.
*G02B 6/00* (2006.01)
(52) U.S. Cl. .................................. 385/135; 385/139
(58) Field of Classification Search ..................... None
See application file for complete search history.

(56) References Cited

U.S. PATENT DOCUMENTS

| | | | |
|---|---|---|---|
| 5,210,812 A * | 5/1993 | Nilsson et al. | 385/100 |
| 6,215,930 B1 * | 4/2001 | Estes et al. | 385/100 |
| 7,120,347 B2 * | 10/2006 | Blackwell et al. | 385/135 |
| 2005/0163448 A1 * | 7/2005 | Blackwell et al. | 385/135 |
| 2006/0093278 A1 * | 5/2006 | Elkins et al. | 385/76 |
| 2006/0147172 A1 * | 7/2006 | Luther et al. | 385/135 |
| 2006/0153517 A1 * | 7/2006 | Reagan et al. | 385/135 |
| 2006/0285807 A1 * | 12/2006 | Lu et al. | 385/92 |

* cited by examiner

*Primary Examiner*—Frank G Font
*Assistant Examiner*—Eric Wong
(74) *Attorney, Agent, or Firm*—Myers Bigel Sibley & Sajovec

(57) ABSTRACT

A terminal for connecting customers to an optical fiber network includes a terminal housing and an optical fiber splitter in the housing. An optical fiber cable stub extends from the housing. The optical fiber cable stub has an optical fiber extending therein that is coupled to the splitter in the housing. A plurality of termination connectors are connected to the housing. Ones of the termination connectors have a customer optical fiber connection point accessible from outside the terminal housing and respective optical fibers extending in the housing from the termination connectors to the splitter. The splitter is configured to couple the optical fiber from the optical fiber cable stub to the optical fibers extending from the termination connectors to couple a single optical fiber from the optical fiber cable stub to a plurality of customer optical fiber connection points.

24 Claims, 10 Drawing Sheets

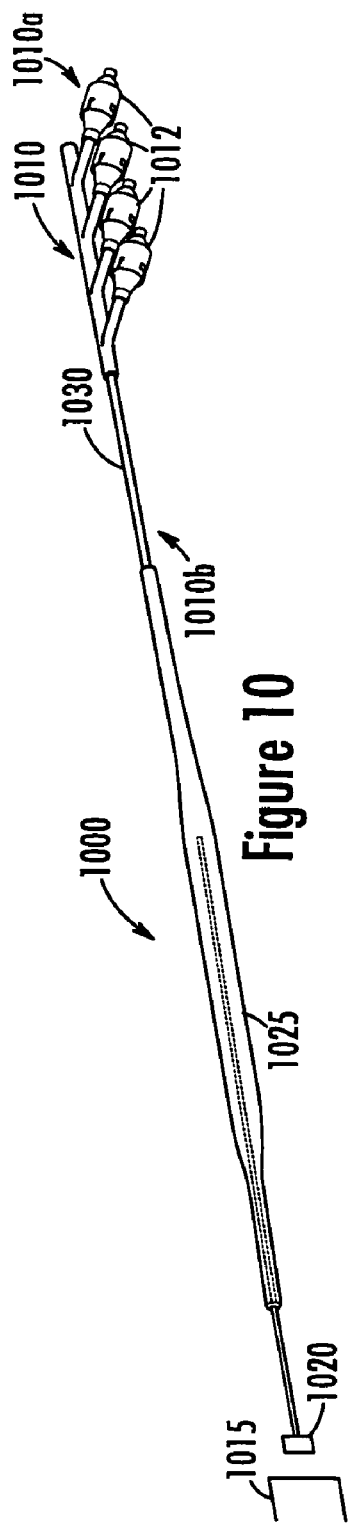
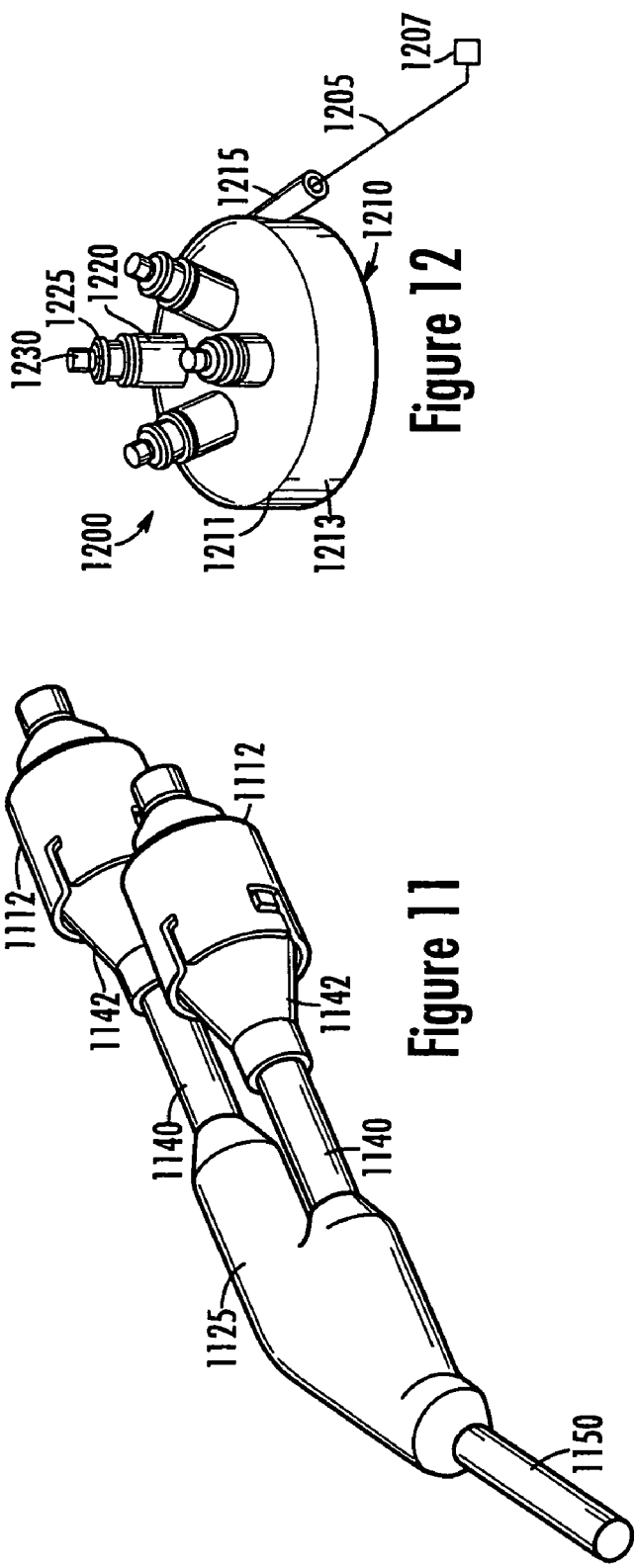
Figure 10
Figure 11
Figure 12

US 7,444,056 B2

OPTICAL NETWORK ARCHITECTURE AND TERMINALS FOR USE IN SUCH NETWORKS

RELATED APPLICATIONS

This application claims the benefit of and priority to U.S. Provisional Patent Application No. 60/685,975, entitled "OPTICAL NETWORK ARCHITECTURE, TERMINALS FOR USE IN SUCH NETWORKS AND METHODS FOR USING THE SAME," filed May 31, 2005, and the benefit of and priority to U.S. Provisional Patent Application No. 60/702,146, entitled "MULTITAP OPTICAL FIBER TERMINATION APPARATUS AND OPTICAL NETWORK ARCHITECTURE, TERMINALS FOR USE IN SUCH NETWORKS AND METHODS FOR USING THE SAME," filed Jul. 25, 2005 the disclosures of which are hereby incorporated herein by reference as if set forth in their entirety.

BACKGROUND OF THE INVENTION

This invention relates to optical fiber networks and methods of configuring the same, and more particularly to such networks including splitters.

Optical fiber networks are increasingly being installed to support high speed voice and data communications. Increasingly, the optical fiber coupling is being expanded out from the central office of the communication service provider companies, such as Regional Bell Operating Companies (RBOCs) to the subscriber locations, such as homes or businesses, where conventional copper wiring was conventionally used. One type of network architecture used for such networks is a centralized splitter network architecture.

FIG. 1 illustrates the components typically used in a conventional centralized splitter network architecture. These networks generally utilize electronics and lasers located in the Central Office (CO) 100 to provide service to multiple customers over a single fiber. The fiber 102 leaving the CO 100 is typically routed to a geographically convenient point near the customer service area. The signal at this point is then generally routed through an optical splitter 106, shown in a centralized splitter cabinet (CSX2) 105 in FIG. 1. The optical splitter 106 converts each input fiber into "n" number of active fibers. Splitters are typically referred to as 1×n where "n" represents the number of output fibers or "ports." Each output port of the splitter 106 may be terminated with a connector and can provide full service to a subscriber (i.e., a customer (or potential customer) who has signed up for service from the provider). Splitters are typically added in pairs (two 1×32 splitters) due to the fact that each input fiber is typically spliced (a procedure that generally requires set up and a higher skilled technician than is usually required for general service)

With two 1×32 splitters, 64 active ports are available for assignment. These ports are referred to as stranded until subscribers take service and are coupled to the ports. Thus, with only one subscriber on the network, 63 ports are stranded. This process, of connecting customers as subscribers, typically occurs at a cabinet, shown as a centralized splitter cabinet 105 in FIG. 2 (also referred to herein as an optical splitter cabinet) that incorporates a connector field 108 (an array of connectorised fibers that permit easy mating, de-mating and reassignment of fibers via pigtails) sufficiently sized to provide each prospective customer a fiber optic connection point. This architecture generally requires a great deal of engineering to determine the maximum number of potential and future customers, such that day 1 (initial install of cable) a distribution cable with a ratio of 1 fiber to 1 customer (i.e., potential subscriber) may be placed. To accommodate unknown/unexpected expansion, extra fiber is usually placed as well. Thus, from the cabinet onward, one future customer equals one fiber in the distribution network.

The optical splitter cabinet's connector field 108 generally allows for efficient utilization of the high dollar CO equipment by provisioning service (i.e., coupling to the CO equipment) only to those customers that have subscribed for service. The optical signal leaving the cabinet 105 in such network architectures typically runs uninterrupted via the distribution network directly to the subscriber's premises. FIG. 1 illustrates a typical customer area of 288 access points available from a single centralized splitter cabinet 105 (it will be understood that additional centralized splitter cabinets 105 may also be coupled through the central office 100 and that a network may include more than one central office 100). Using the 288 point example, the distribution side of the typical conventional network has 288 fibers exiting the cabinet 105.

The cable exiting the cabinet 105 would typically be spliced into several smaller cables via a branching closure 110. The branching closure 110 is an aggregation point for multiple cables in the distribution network. The total fiber count does not generally change at the branching closure 110. The example in FIG. 1 evenly distributes the fibers between four cables (72 fibers each) running North, South, East and West. The 72 count fiber cables utilize distribution closures 115a, 115b, 115c to splice in optical distribution terminals (OTDs) 120a, 120b, 120c along their paths. The terminals 120a, 120b, 120c are typically placed "Day 1" and provide drop fibers to pockets of potential customers (N). Terminals 120a, 120b, 120c usually have 4 or 8 fibers or associated connector ports with "N" equaling the number of potential customers per terminal 120a, 120b, 120c. Thus, the number of active fibers decreases by "N" after each terminal 120a, 120b, 120c. Thus, after passing only distribution closures 115a, 115b, one having an associated 4 port terminal 120a and one having an associated 8 port terminal 120b, only 60 fibers of the original 72 in the distribution cable remain available for terminal assignment. Note that a 72 (or more) fiber optical fiber cable may be used for the entire run, with the number of those fibers coupled all the way back to the centralized splitter cabinet 105 progressively decreasing. Based on this conventional architecture, each time a subscriber is added to the network, a technician must typically visit both the centralized splitter cabinet 105 and a terminal 120a, 120b, 120c coupled to a distribution closure 115a, 115b, 115c proximate the customer to provision service (properly route the light from the CO 100 through the splitter 106 in the centralized splitter cabinet 105 to the subscriber's premises).

SUMMARY OF THE INVENTION

In some embodiments of the present invention, a terminal is provided with an optical fiber cable stub extending therefrom and a splitter therein. A connector may be provided on an end of the optical fiber cable stub to facilitate coupling of the terminal to a distribution closure or the like. The connector may be a single fiber connector and the optical fiber cable stub may be a single fiber cable stub. The terminal may include a plurality of termination connectors extending therefrom configured to couple to individual subscriber premise lines to provide service to a subscriber and the termination connectors may all be coupled to the fiber from the optical fiber cable stub through the splitter in the terminal.

In other embodiments of the present invention, an optical network is provided including an optical splitter cabinet coupled to a plurality of distribution closures configured to couple to a terminal having multiple connection points thereon for subscribers, wherein a single optical fiber from the optical splitter cabinet extends from the optical splitter cabinet to be connected to a plurality of connection points in the terminal. The optical splitter cabinet may further be connected to an optical fiber cable from a central office and may include one or more splitters for connecting optical fibers from the central office optical fiber cable to ones of the distribution closures. The optical splitter cabinet may further include a connector field for selectively coupling ones of the optical fibers from the central office optical fiber cable to ones of the optical fibers extending from the optical splitter cabinet to the distribution closures. A branching closure may be provided between the optical splitter cabinet and the distribution closures to provide for routing of optical fibers from the optical splitter cabinet to different locations using respective reduced fiber count optical fiber cables.

In yet other embodiments of the present invention, optical fiber distribution systems include means for selectively changing a number of optical ports for connecting to customer premises coupled to a single fiber extending to a distribution closure.

In further embodiments of the present invention, methods are provided for configuring and changing the configuration of networks as described above.

In some embodiments of the present invention, terminals for connecting customers to an optical fiber network include a terminal housing and an optical fiber splitter in the housing. An optical fiber cable stub extends from the housing. The optical fiber cable stub has an optical fiber extending therein and coupled to the splitter in the housing. A plurality of termination connectors are connected to the housing. Ones of the termination connectors having a customer optical fiber connection point accessible from outside the terminal housing and respective optical fibers extending in the housing from the termination connectors to the splitter. The splitter is configured to couple the optical fiber from the optical fiber cable stub to the optical fibers extending from the termination connectors to, thus, couple a single optical fiber from the optical fiber cable stub to a plurality of customer optical fiber connection points.

In further embodiments of the present invention, the optical fiber cable stub further includes a termination connector on an end thereof removed from the terminal housing. The termination connector is configured to optically couple the optical fiber extending in the optical fiber cable stub to the optical fiber network. The termination connector may be configured to connect the optical fiber extending in the optical fiber cable stub to a distribution closure of the optical fiber network. The optical fiber cable stub may include only a single optical fiber extending therein.

In other embodiments of the present invention, the respective customer optical fiber connection points include an end of the termination connectors extending from the termination housing and being configured to couple to an individual customer premise line to provide service to a customer. The plurality of termination connectors may be four and/or eight termination connectors, each of which is coupled to a single optical fiber extending in the optical fiber cable stub.

In some embodiments of the present invention, the terminal housing is an environmentally sealed housing and the ends of the termination connectors extending from the housing include a seal member that seals the termination connector when a customer premise line is not coupled thereto. The ends of the termination connectors extending from the housing may also be configured to sealingly couple to a customer premise line coupled thereto to maintain environmental sealing of the housing.

In further embodiments of the present invention, the optical splitter is a non-symmetrical splitter. One of the termination connectors is a pass through port having an optical fiber extending therefrom to the splitter configured to carry a plurality of customer signals. An additional terminal may have its optical fiber cable stub coupled to the pass through port.

In yet other embodiments of the present invention, optical fiber networks include an optical splitter cabinet and a plurality of distribution closures coupled to optical fibers extending from the optical splitter cabinet. Each of the distribution closures is configured to optically couple a plurality of customer connection points of a terminal having multiple connection points thereon to a single optical fiber from the optical splitter cabinet. The optical splitter cabinet may be connected to an optical fiber cable from a central office and the optical splitter cabinet may include at least one splitter configured to connect optical fibers from the central office optical fiber cable to ones of the distribution closures.

In other embodiments of the present invention, the optical splitter cabinet includes a connector field configured to selectively couple ones of the optical fibers from the central office optical fiber cable to ones of the optical fibers extending from the optical splitter cabinet to the distribution closures. A branching closure may be positioned between the optical splitter cabinet and the distribution closure that routes optical fibers from the optical splitter cabinet to different locations using respective outgoing optical fiber cables having a lesser number of optical fibers extending therein than a number of optical fibers in an incoming optical fiber cable between the optical splitter cabinet and the branching closure.

In yet further embodiments of the present invention, methods for configuring an optical fiber network include coupling optical fibers from a central office of a provider of the optical fiber network to distribution closures in a service area of the optical fiber network through an optical splitter cabinet. Ones of the distribution closures to be configured are selected. A termination connector count for terminals to be coupled to the selected ones of the distribution closures is selected. The selected terminals are coupled to their respective distribution closures. The coupling of optical fibers through the optical splitter cabinet couples a plurality of termination connectors on one of the selected terminals to a single optical fiber extending from the optical splitter cabinet.

In other embodiments of the present invention, the coupling of optical fibers through the optical splitter cabinet couples a plurality of termination connectors on each of the selected terminals to a respective single optical fiber extending from the optical splitter cabinet. The coupling of optical fibers through the splitter cabinets may include extending a single optical fiber from the optical splitter cabinet to a respective single terminal connector of one of the distribution closures configured to receive one of the terminals.

In further embodiments of the present invention, coupling of the selected terminals is followed by determining that a change in configuration of the optical fiber network is desired. At least one of the distribution closures to change for the desired change in configuration is identified. A terminal is selected for the identified at least one of the distribution closures for the desired change in configuration. The selected terminal is coupled to the identified at least one of the distribution closures and optical fiber connections in the optical splitter cabinet are configured to support service to the selected terminal to provide the desired change in configuration. The desired change in configuration may be, for example, an increase in customer connection points at the identified at least one of the distribution closures.

In yet other embodiments of the present invention, the desired change in configuration includes replacing a terminal at a distribution closure having a first customer connection point count with a terminal having a second customer connection point count greater than the first customer connection point count. Configuring the optical fiber connections in the optical splitter cabinet in such embodiments includes changing a splitter configuration in the optical splitter cabinet to support service to a greater number of customers on a single optical fiber extending from the distribution closure having the selected terminal coupled thereto to the optical fiber splitter cabinet. Configuring the optical fiber connections in the optical splitter cabinet may further include changing the splitter configuration in the optical splitter cabinet to provide a corresponding reduction in capacity to support service to another of the optical fibers extending from the optical fiber splitter cabinet.

In further embodiments, an optical fiber distribution system includes means for selectively changing a number of optical ports for connecting to customer premises coupled to a single fiber extending to a distribution closure and at least one optical fiber of the optical fiber distribution system extending to the distribution closure. The system may further include means for changing a portion of a capacity of at least one fiber extending from a central office of the optical fiber distribution system allocated to the single fiber extending to the distribution closure based on the changed number of optical ports.

In other embodiments, the means for changing a portion of a capacity of at least one fiber includes an optical splitter cabinet including a splitter and/or a non-symmetric splitter. The means for selectively changing a number of optical ports may include a terminal having a splitter therein configured to couple a plurality of customer connection points of the terminal to a single optical fiber having an end configured to be coupled to the distribution closure. The means for selectively changing a number of optical ports may further include an optical splitter cabinet having a connector field for selectively coupling the single fiber extending to the distribution closure to a fiber extending from the optical splitter cabinet to a central office of the optical fiber distribution system.

In further embodiments, terminals for connecting customers to an optical fiber network include a terminal housing and an optical fiber splitter in the housing. An optical fiber cable connector member extends from the housing and has a network termination connector on an end thereof removed from the terminal housing that is configured to optically couple to the optical fiber network. The optical fiber cable connector member has an optical fiber extending therein that couples the network termination connector to the splitter in the housing. A plurality of customer termination connectors are connected to the housing. Ones of the customer termination connectors have a customer optical fiber connection point accessible from outside the terminal housing and respective optical fibers extending in the housing from the customer termination connectors to the splitter. The splitter is configured to couple the optical fiber from the optical fiber cable connector member to the optical fibers extending from the customer termination connectors to couple a single optical fiber from the optical fiber cable stub to a plurality of customer optical fiber connection points.

BRIEF DESCRIPTION OF THE DRAWINGS

FIG. 10 is a perspective view of a terminal for connecting customers to an optical fiber network according to other embodiments of the present invention.

FIG. 11 is a perspective view of a terminal for connecting customers to an optical fiber network according to further embodiments of the present invention.

FIG. 12 is a perspective view of a terminal for connecting customers to an optical fiber network according to yet other embodiments of the present invention.

DETAILED DESCRIPTION

Figure 1:
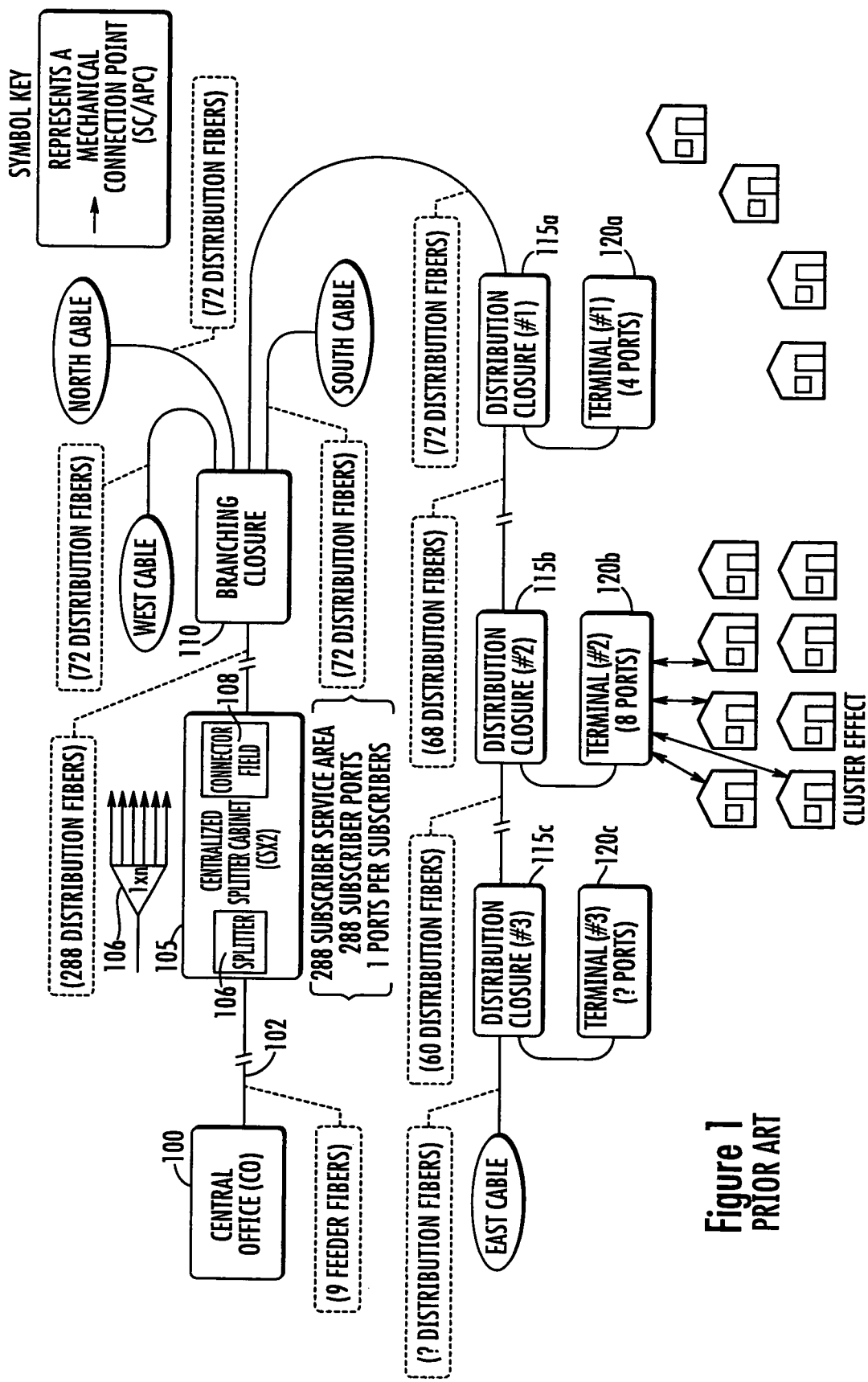
FIG. 1 is a schematic diagram illustrating a conventional optical fiber network.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
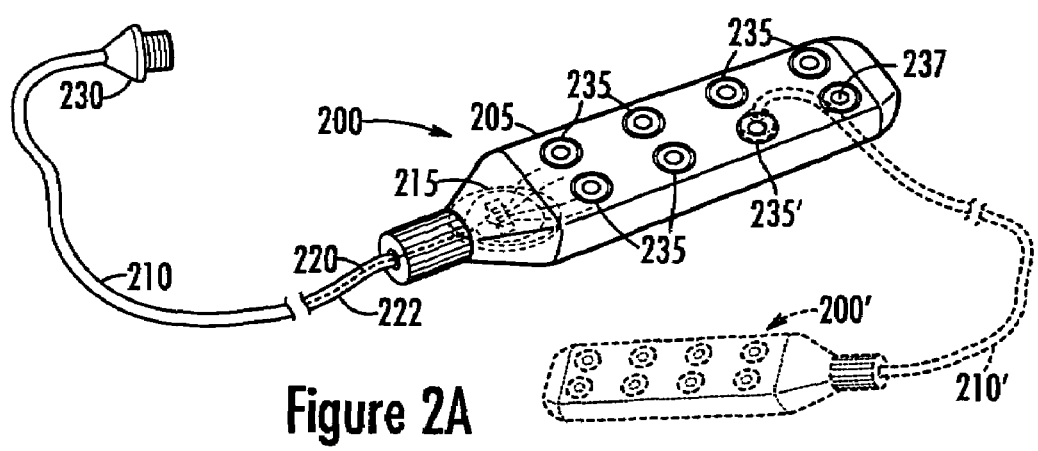
FIG. 2A is a perspective view of a terminal for connecting customers to an optical fiber network according to some embodiments of the present invention.
Figure 2B:
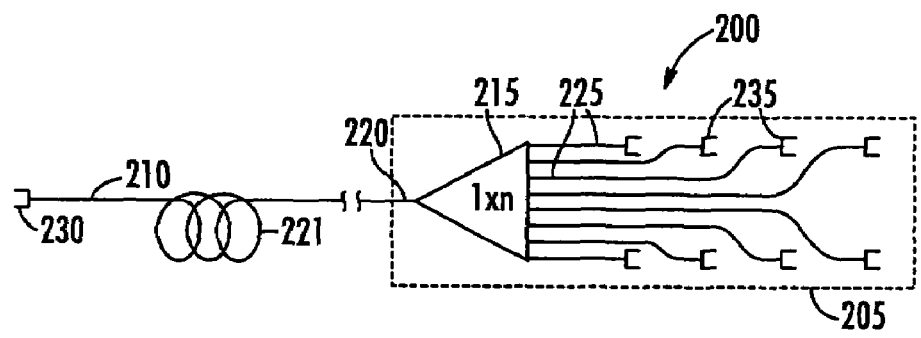
FIG. 2B is a schematic diagram illustrating the optical routing of the terminal of FIG. 2A.

FIGS. 2A and 2B illustrate an Optical Distribution Terminal (ODT) 200 that incorporates an optical splitter 215 in a terminal housing 205. An ODT 200 with eight customer termination connectors 235, such as OptiTap™ connectors available from Corning, Inc., is shown in FIGS. 2A and 2B. The optical splitter 215 may be passive or active. The ODT 200 in some embodiments can be fusion and/or mechanically spliced and/or mechanically connected (i.e., by a connector 230) into the optical network (for example, through a distribution closure 315a, 315b, 315c (FIG. 3) of the optical network) by a single fiber 220, which may then be split into multiple fibers 225 using the optical splitter 215 in the ODT 200. In contrast, conventional terminal designs generally require the use of multiple fibers (1 fiber per terminal port) to carry the optical signal to each terminal port.

The terminal 200 includes an optical fiber cable stub 210 extending from the terminal housing 205. The optical fiber cable stub 210 includes an optical fiber 220 extending through a protective sheath 222 to a termination connector 230 on an end thereof remote from the terminal housing 205. The termination connector 230 is configured to optically couple the optical fiber 220 to an optical fiber network. The optical fiber 220 is coupled to the splitter 215 in the terminal housing 205. While an optical fiber cable stub 210 is shown in the embodiments of FIG. 2, it will be understood that, in some embodiments, the connector 230 may be directly mounted to a network connector member of the terminal housing 205 without a stub length of optical fiber extending in the protective sheath 222 therebetween.

The termination connectors 235 are connected to the terminal housing 205 and have an end thereof extending from the housing 205 providing a customer optical fiber connection point 237 accessible from outside the housing 205 that is configured to couple to an individual customer premise line to provide service to a customer. Respective optical fibers 225 extend in the housing 205 from the termination connectors 235 to the splitter 215. The splitter 235 is configured to optically couple the single optical fiber 220 from the optical fiber cable stub 210 to the optical fibers 225 extending from the termination connectors 235 to couple the single optical fiber 220 to a plurality of customer fiber optical connection points 237.

In some embodiments of the present invention, the use of a single fiber feed to the ODT 200 eliminates the need to connect (splice) multiple fibers from the terminal optical fiber cable stub 210 (i.e., the optical fiber cable, such as a drop cable, extending from the ODT) to the distribution cable of the optical fiber network by integrating the optical splitter 215 into the terminal 200. Thus one splice or a single fiber connector 230, such as an OptiTap™ connector, may be used to energize (provide an active optical path to central office equipment 100) all of the ports customer optical fiber connection points 237) of the termination connectors 235 on the ODT 200. Other benefits of such an architecture may include the ability to replace, upgrade, and/or downgrade any ODT 200 in the network without adding additional fibers and/or wasting unassigned fibers from the distribution cable as will be further described herein. The terminal 200 also may incorporate a rugged stub 210 that may be as short as a few feet, or as long as several hundred to a thousand or more feet.

Figure 3:
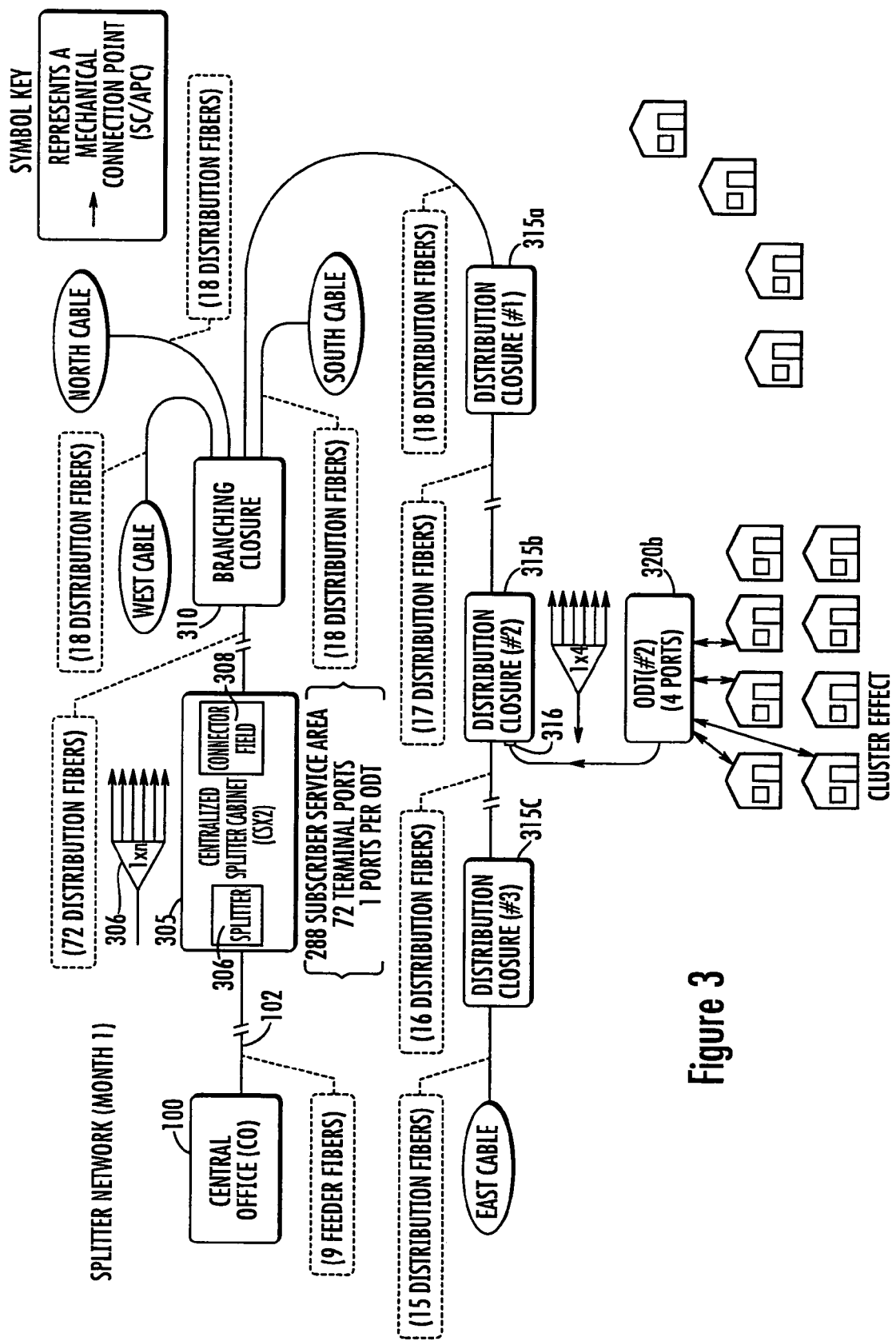
FIG. 3 is a schematic diagram illustrating an optical fiber network according to some embodiments of the present invention.

As also shown in FIG. 2, an additional terminal 200' may have its optical fiber cable stub 210' coupled to a port of a termination connector 235' of the terminal 200. In such embodiments, the splitter 215 may be a non-symmetrical splitter and the termination connector 235' may be a designated pass through port having the optical fiber 225 extending therefrom to the splitter 215 configured to carry a plurality of customer signals. Thus, a plurality of terminals 200, 200' may be serially coupled together to provide an increased number of customer connection points while limiting the number of termination connectors 235 on any individual terminal 200, 200'. A limited range of terminal options may also thereby provide an increased flexibility in the number of customer connection points that may be provided at an individual distribution closure 315a, 315b, 315c (FIG. 3).

A typical ODT may be provided in 4 or 8 port configurations (8 port version shown in FIG. 2), however, other combinations, such as 2,3,5,6 ... 64, could be provided as well. The pass through port 235' may also be incorporated into the terminal 200 to offer the ability to connect and add an additional ODT 200 (or multiple series additional ODTs 200x) without disruption of service. The pass through in some embodiments may be provided through the use of a non-symmetrical split ratio as contrasted with the symmetrical split ratio used in most conventional systems as discussed above. It will be understood that, while a particular terminal configuration is shown in FIG. 2, other terminals, such as the terminals illustrated in FIGS. 9-12, may also be utilized with a splitter incorporated therein in other embodiments of the present invention.

Various optical fiber networks according to some embodiments of the present invention will now be described with reference to the illustrative embodiments shown in FIGS. 3-6. FIGS. 3-6 illustrate various components used in some embodiments of the present invention having what may be referred to as a hybrid splitter network architecture (i.e., a splitter at a central splitter cabinet 305 and at a terminal 320b). The sequence of FIGS. 3 through 6 further illustrate an example of how the network components could evolve over time to illustrate, among other things, various advantages of some embodiments of the present invention in accommodating re-configuration of a network over time. Each of FIGS. 3-6 may be understood as depicting a snapshot of the network at various points in its history. An arbitrary time period change of one month between figures is shown for illustrative purposes but each period could as well represent passage of several months or years or the like and the periods need not be uniform.

By reviewing the geographic distribution of subscribers over time on existing Fiber To The Premises (FTTP) optical networks, the present inventors have determined that the conversion from customer to subscriber may not be random or evenly distributed over most networks. In actuality a "Cluster Effect" of subscriber density in particular neighborhoods or the like may be observed. This may be caused when one random individual takes service and promotes by word of mouth the benefits to adjoining neighbors. The result may be geographic clusters of subscribers with little to no activity on the network between clusters. The cluster effect may make it desirable to place terminals only in these active geographic regions.

The optical fiber network according to various embodiments of the present invention may utilize some of the same components found in today's architectures from the CO 100 up to the optical splitter cabinet 305 as described with reference to FIG. 1. However, in the illustrated embodiments of the present invention, each fiber exiting the cabinet 305 may no longer represent a single customer but rather a terminal (ODT) 320b. The hybrid architecture according to some embodiments may allow for part of the optical splitting to occur at the cabinet 305 and the remaining split to occur at the ODT 320b. Using current optical equipment infrastructure, the splitting in various embodiments may still maintain the final split ratio (typically 1/32 of the initial power). In other words, a single line from the centralized splitter cabinet 305 to the central office 100 may be limited to no more than thirty-two active subscribers. This can be achieved in many ways. For example, by feeding the outputs of a 1×8 splitter into the inputs of eight 1×4 splitters and/or by feeding the outputs of a 1×4 splitter into the inputs of four 1×8 splitters and/or the like. These splitters generally do not need to be co-located to achieve the 1/32 ratio.

As seen in the embodiments of FIG. 3, a plurality of distribution closures 315a, 315b, 315c are coupled to optical fibers extending from the optical splitter cabinet 305. The distribution closures 315a, 315b, 315c are configured to optically couple a plurality of customer connection points of a terminal 320b having multiple connection points thereon to a single optical fiber from the optical splitter cabinet 305. The optical splitter cabinet 305 is connected to an optical fiber cable 102 from the central office 100 and includes one or more splitters 306 configured to connect optical fibers from the central office optical fiber cable 102 to ones of the distribution closures 315a, 315b, 315c. A connector field 308 of the optical splitter cabinet 308 may be configured to selectively couple ones of the optical fibers from the central office optical fiber cable 102 to particular ones of the optical fibers extending from the optical splitter cabinet 308 to the distribution closures 315a, 315b, 315c. A branching closure 310 positioned between the optical splitter cabinet 305 and the distribution closures 315a, 315b, 315c may route optical fibers from the optical splitter cabinet 305 to different locations using respective outgoing optical fiber cables having a lesser number of optical fibers extending therein than the number of optical fibers in an incoming optical fiber cable from the optical splitter cabinet 305.

The connectorized outputs of the splitter cabinet's splitter(s) 306 (which may be, for example, 1×4s or 1×8s rather than 1×32s) may be used to assign service to specific ODTs 320b (with corresponding 1×8s or 1×4s splitters therein). Connectorized cabinet splitter inputs may be used to simplify adding additional splitters as desired in the centralized optical splitter cabinet 305. The present inventors, based on review of networks, expect that the assignment of terminals would be randomly located over the network. Network scalability may be achieved by utilizing the splitter cabinet's connector field 308 to maintain the ability to randomly assign service to respective ODTs 320b. The Cluster Effect would infer that these initial terminals (ODTs) may have a greater chance of providing service to multiple customers and, thus, may provide a higher utilization rate. In addition, a significant reduction may be provided in the number of connectors located at the cabinet 305 in light of the reduced number of outgoing optical fibers. This reduction may be achieved, for example, by making each connector represent a minimum of four customers (as each ODT would typically serve a minimum of 4 customers). The net effect in this example is a reduction of the connector field 308 at the cabinet 305 by at least 75%. By requiring only ¼ the number of connections at the cabinet 305, a significant reduction in the splitter cabinet's overall size, weight and cost can be achieved. Furthermore, lower split ratio splitters, such as 1×4 and 1×8, as compared to 1×32s may be installed day 1 (i.e., initially), which may result in fewer stranded ports. Comparing the same sized 288 customer service area example as described with reference to FIG. 1, only 72 fibers exit the cabinet 305 in some embodiments of the present invention.

These 72 fibers may still pass through the branching closure 310 and be sub divided into smaller count distribution cables. The illustrated example of FIGS. 3-6 again evenly distributes the fibers between four cables (18 fibers each) running North, South, East and West. The reduction in fibers required in this part of the network may be a significant benefit to restoration crews repairing cable cuts. Repairing cable cuts (which typically cut every fiber in an optical fiber cable) usually requires a 1 fiber to 1 subscriber re-splice to restore service (as each fiber in the cable must be spliced but each is only one subscriber in the network of FIG. 1). The hybrid network according to some embodiments of the present invention may simplify this task by allowing multiple customers to be restored for every repair splice, thus potentially requiring significantly less splicing to restore service.

The 18 count fiber cables may utilize distribution closures 315a, 315b, 315c to splice in terminal(s) 320b through ruggedized connectors 316 along the cable paths. These connectors 316 at the distribution closure 315a, 315b, 315c (which may be 1 SC/APC connector per distribution closures) may be located near pockets of potential customers "N" or at a location that currently offers no potential customers but, due to anticipated growth, warrant consideration. By providing the connectorized input stub 210 having a connector 230 on the ODT 200 (see, FIG. 2), in some embodiments of the present invention, service providers may be enabled to place terminals in the network on an as needed basis as compared to placing all terminals day one. The integrated splitter 215 located in the OTD 200 may allow the number of subscribers to vary at each distribution closure 315a, 315b, 315c without requiring multiple fibers to be assigned. Thus, the number of active fibers may decrease by 1 for every distribution closure 315a, 315b, 315c passed and not by "N" as described in reference to FIG. 1. By simplifying the placement of terminals 320b, the entire network may be built with limited engineering concern given to predetermining terminal size.

As seen in the example of FIG. 3, after passing only two potential ODT locations 315a, 315b, 16 of the original 18 fibers in the distribution cable remain available for ODT assignment. This is in contrast to the current conventional approach of making terminal connection via a multifiber connector. The multi fiber connector approach would maintain all the splitters in the cabinet 105, may be technically more difficult and would not be expected to reduce the cabinet size or distribution cable size. The hybrid network architecture of various embodiments of the present invention, on the other hand, may allow the service providers to take greater risk in deploying fiber "Day 1" by offering flexibility and scalability while at the same time reducing capital investments associated with distribution cable size. Further delayed capital investment may be achieved by not placing (or limiting placement of) any ODTs "Day 1." Once the network is complete and ready for subscribers, ODTs 320b may be placed as needed. For the architecture of some embodiments of the present invention, technicians may only need to visit the splitter cabinet 305 when placing or redefining an ODT 302b. Thus, when provisioning service, a technician may only need to visit the subscriber's premises if an ODT 320b exists at that location with an empty port.

Figure 4:
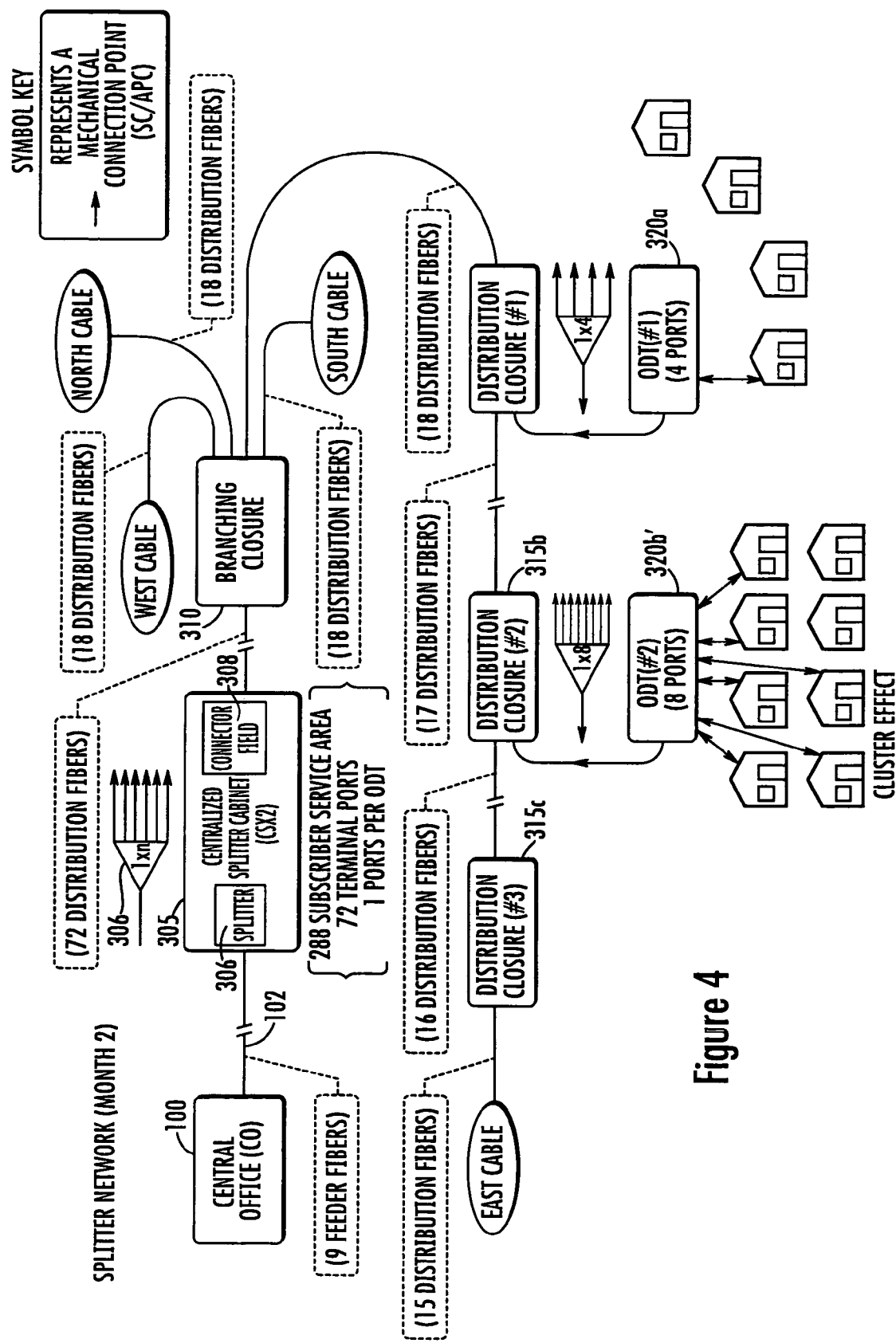
FIGS. 4 to 6 are schematic diagrams illustrating the optical fiber network of FIG. 3 after configuration changes according to some embodiments of the present invention.
Figure 5:
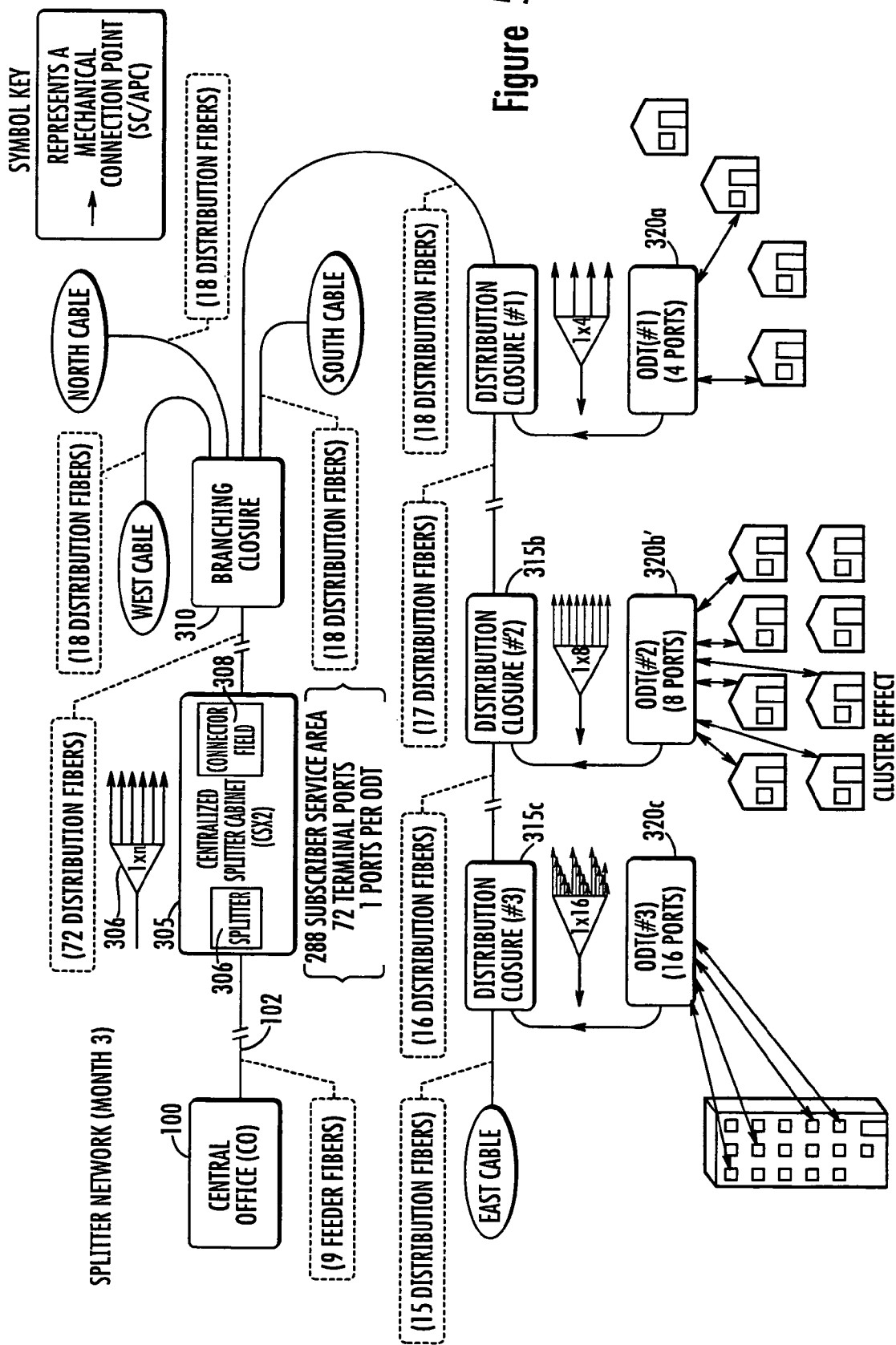
Figure 6:
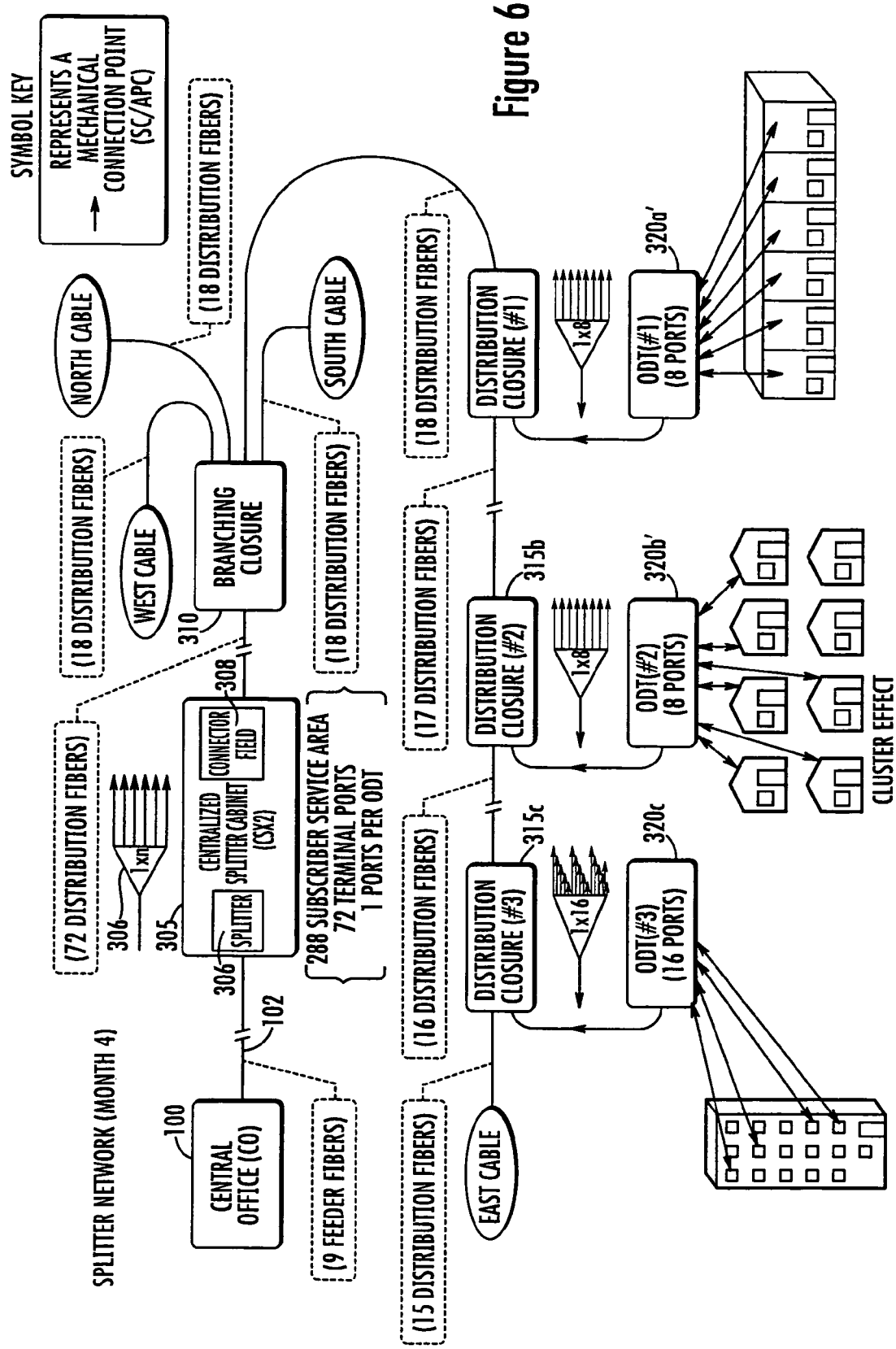

FIG. 3 illustrates a 4 port ODT 320b placed at the second distribution closure 315b. The ODT 320b is shown as undersized for the location (based on illustrated number of potential customers) but, with 4 subscribers taking service, 100% utilization is achieved. FIG. 4 illustrates the flexibility of various embodiments of the present invention. The 4 port ODT 320b has been replaced with an 8 port ODT 320b' at the second distribution closure 315b and a 4 port ODT 320a has been placed at the first distribution closure 315a. In FIG. 5, a second subscriber has been added to the ODT 320a (without requiring a visit to the cabinet 305). An unplanned apartment complex is shown as having been added at the third distribution closure 315c. For the illustrated scenario of FIG. 5, to maintain the 1/32 split ratio, a 1×16 ODT 320c is placed and a 1×2 splitter is added in the cabinet 305. FIG. 6 indicates a business park replacing the homes located at the first distribution closure 315a, leading to replacement of the 4 port ODT 320a with an 8 port ODT 320a'. These types of events are typical occurrences that may drastically affect conventional networks. The hybrid architecture of some embodiments of the present invention, as illustrated herein, may readily handle such events with minimal disruption of service or new capital investment.

Methods for configuring an optical fiber network according to some embodiments of the present invention will now be described with reference to the flowchart illustrations of FIGS. 7 and 8. For the embodiments illustrated in FIG. 7, operations begin at Block 700 with coupling optical fibers from a central office of a provider of the optical fiber network to distribution closures in a service area of the optical fiber network through an optical fiber splitter cabinet. A distribution closure to be configured is selected (Block 710). A termination connector count for a terminal to be coupled to the selected one of the distribution closures is selected (Block 720). If additional closures remain to be configured (Block 730), operations at Block 710 and 720 repeat for configuring the additional distribution closure(s). Once all the closures have been configured (Block 730), the selected terminals are coupled to their respective distribution closures (Block 740).

The coupling of optical fibers through the optical splitter cabinet couples a plurality of termination connectors on one of the selected terminals to a single optical fiber extending from the optical splitter cabinet to a central office or the like. Different ones of the selected terminals may be coupled through the optical splitter cabinet to respective single optical fibers extending from the optical splitter cabinet to the central office. A connectorized approach may be utilized at the distribution closures, where a single optical fiber from the optical splitter cabinets extends to a respective single terminal connector of one of the distribution closures, which single terminal connectors are configured to receive ones of the selected terminal. Thus, each terminal may have a connectorized cable stub with a connector on the end for a single fiber connection, which is coupled to a corresponding single terminal connector on a distribution closure.

Further embodiments of methods for configuring an optical fiber network will now be described with reference to FIG. 8. More particularly, the operations illustrated in FIG. 8 relate to embodiments where a configuration change is implemented. For the embodiments illustrated in FIG. 8, operations begin at Block 800 with determining that a change in configuration of the optical fiber network is desired. At least one of the distribution closures to change for the desired change in configuration is identified (Block 810). A terminal is selected for the identified distribution closure for the desired change in configuration (Block 820). If additional distribution closures are to be changed (Block 830), operations at Block 810 and 820 repeat for each of the respective distribution closure(s) being changed. Once the changes have been identified (Block 830), the selected terminals are coupled to the identified one or more distribution closures (Block 840). Optical fiber connections in the optical fiber splitter cabinet are also configured to support service to the selected terminals to provide the desired change in configuration (Block 850).

Figure 8:
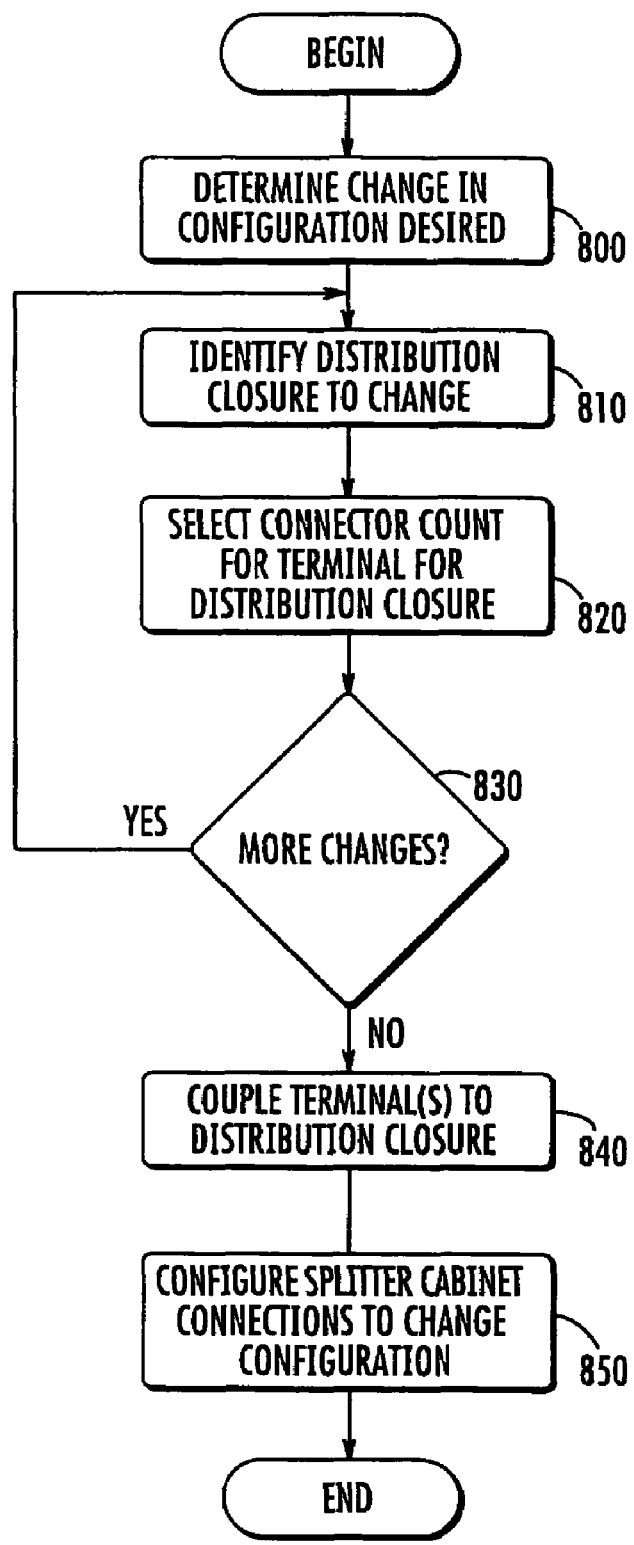
FIG. 8 is a flowchart illustrating operations for configuring an optical fiber network according to further embodiments of the present invention.

A change in configuration implemented in some embodiments as illustrated in FIG. 8 may include an increase in customer connection points at an identified distribution closure or closures. The change in configuration may include replacing a terminal at a distribution closure having a first customer connection point count with a terminal having a second customer connection point count greater than the first customer connection point count. Configuring the optical fiber connection and the optical splitter cabinet may then include changing a splitter configuration in the optical splitter cabinet to support service to a greater number of customers on a single optical fiber extending from the central office to the distribution closure with the changed terminal coupled thereto through the optical fiber splitter cabinet. In addition, the changes at the optical splitter cabinet may include changing the splitter configuration in the optical splitter cabinet to provide a corresponding reduction in capacity to support service to others of the optical fibers extending from the optical fiber splitter cabinet.

Figure 7:
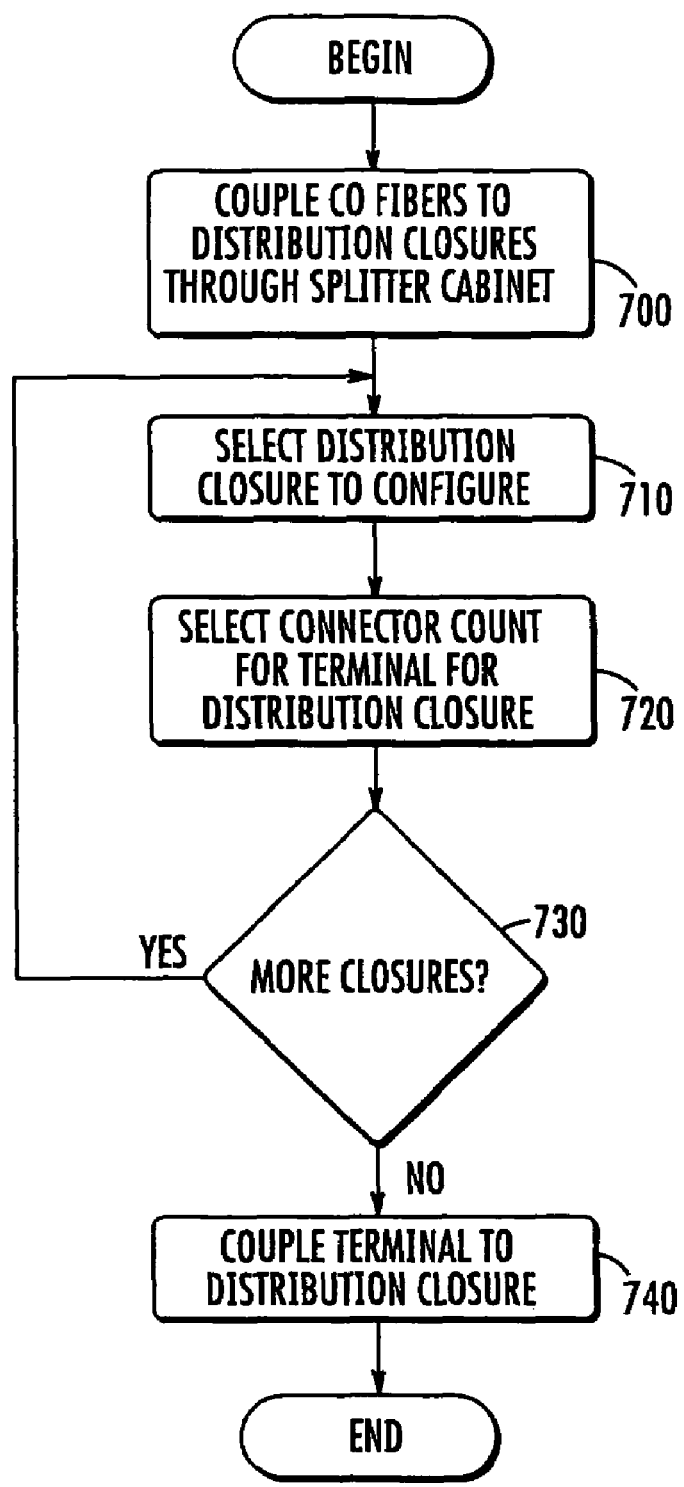
FIG. 7 is a flowchart illustrating operations for configuring an optical fiber network according to some embodiments of the present invention.

The flowcharts of FIGS. 7-8 and the schematic illustrations of FIGS. 3-6 illustrate the functionality and operation of possible implementations of methods for configuring an optical fiber network according to some embodiments of the present invention. It should be noted that, in some alternative implementations, the acts noted in describing the figures may occur out of the order noted in the figures. For example, two blocks/operations shown in succession may, in fact, be executed substantially concurrently, or may be executed in the reverse order, depending upon the functionality involved.

A particular configuration of an OTD including a splitter is illustrated in FIG. 2. However, it will be understood that a variety of different configurations of an OTD including a splitter may be utilized in accordance with some embodiments of the present invention. Particular examples of such different configurations will now be described with reference to the perspective view illustrations of FIGS. 9-12 by way of illustration and without limiting the scope of the present invention.

Figure 9:
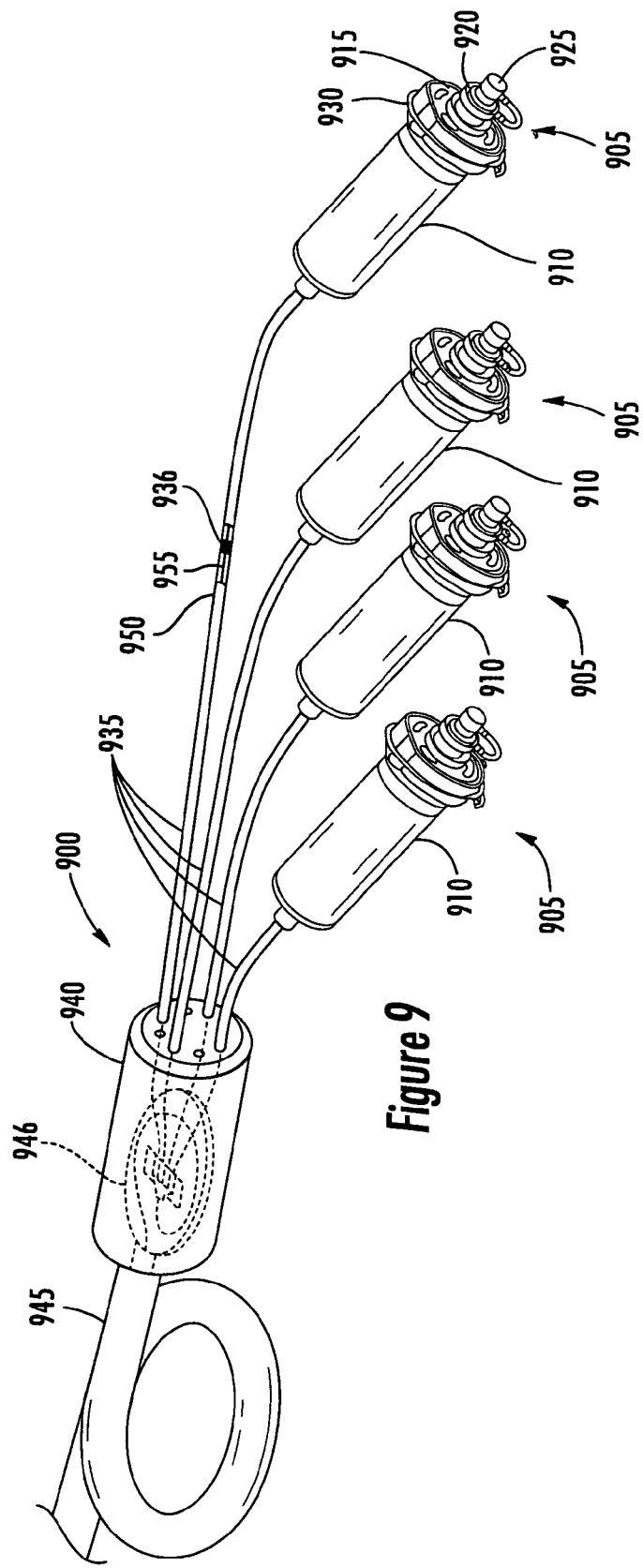
FIG. 9 is a perspective view of a terminal for connecting customers to an optical fiber network according to some embodiments of the present invention.

As shown in FIG. 9, the optical fiber termination assembly 900 includes a plurality (four shown in FIG. 9) of optical fiber termination apparatus 905. Each of the optical fiber termination apparatus 905 is connected to an optical junction box 940 by a respective optical fiber tube 935 extending from the optical fiber termination apparatus 905 to the optical junction box 940. A termination optical fiber 955 extends through each of the optical fiber tubes 135 to an optical fiber splice member, such as the optical fiber splitter tray 946 illustrated in dotted line in FIG. 9. The optical fiber splitter tray 946 is configured to optically couple the optical fibers to a respective source optical fiber extending into the optical junction box 940 as illustrated by the optical drop cable 945. The optical fiber termination apparatus 905 includes a housing 910, a connector adaptor 915 coupled to the housing 910 and a connector 920 positioned in the connector adaptor 915. The connector adaptor 915 has a connector opening configured to mate with a connector 920 of a predetermined connector type, such as an OptiTap™ connector.

Each of the optical fiber termination apparatus 905 shown in the embodiments of FIG. 9 is separately environmentally sealed from other of the optical fiber termination apparatus 905. As seen in FIG. 9, a cap 925 is provided on the connector 920 of each of the optical fiber termination apparatus 905 to close an associated fiber connection member opening into the housings 910. In addition, in some embodiments, a sealant 936 is placed in each of the optical fiber tubes 935 so that, if a cap 925 is left off of a particular connector 920 or the environmental sealing of the particular optical fiber termination apparatus 905 is otherwise breached, moisture or other environmental contaminants leaking into the breached optical fiber termination apparatus 905 may be prevented by the sealant 936 from passing back through to the optical junction box 940 and thereby contaminating other of the optical fiber termination apparatus 905.

Also seen in the embodiments of FIG. 9 on each of the optical fiber termination apparatus 905 is a removable attachment member, shown as a spring member 930 in the embodiments of FIG. 9, that retains the connector adaptor 915 in the housing 910. The spring member 930 may be hand actuable, allowing removal and replacement of the connector adaptor 915 with a different configuration connector adaptor when a different predetermined connector type is to be used in the optical termination apparatus 905.

An optical fiber terminal 1000 is illustrated in the perspective view of FIG. 10 that uses a tubular manifold 1010 to create a fiber pathway leading from a connector end 1010a (i.e. SC connectors, Optitap™, etc.) to at least one tubular end 1010b, which can then be attached to other fibers. The other fibers to which it is attached can be, for example, an optical fiber of a drop cable that may be coupled to at a distribution closure 1015, a main cable and/or those of another fiber splice closure. An illustrative terminal with four tap points to a fiber drop cable is shown in FIG. 10. The optical fiber terminal 1000 in FIG. 10 is shown as having an optical connector 1020 at an end thereof that is configured to optically couple to an optical fiber from the central office in the distribution closure 1015.

The terminal 1000 illustrated in FIG. 10, in various embodiments, may provide a means to join fiber cable to a tube, may use a tube 1030 exiting/entering into a splice/splitter closure 1025 to route fiber from the manifold 1010 to the splice/splitter closure 1025. As discussed with respect to various embodiments previously, a splitter tray or other splitter may be provided in the splice/splitter closure 1025 and used to couple a plurality of optical fibers extending from connectors 1012 in the manifold 1010 to an optical fiber that may be coupled through the connector 1020 and the distribution closure 1015 to the central office. The manifold 1010 may be very narrow, may provide a means to add SC connector/Optitap connectors into a manifold and secure the same therein without threads or a back mounting nut as commonly used with panel mounted connectors of these types, may provide a means to secure SC connector/Opitap without allowing rotation of the connectors or threads thereon and may utilize a stackable manifold providing many selectable configurations.

The receptacle manifold illustrated in FIG. 10 may be constructed many ways, and is shown as a sealed construction made from a dual molding process. Inside is a hard plastic tubular "Y" shaped branch off similar to a 45 degree plumbing fitting. These branch offs can be stacked together in many ways to form single, double, triple, quadruple etc. branch off manifolds. The stacked branch offs may then be overmolded with a second plastic material, which may bond to the branch offs and any cable or additional tubing in the manifold structure. This may provide a very strong sealed piping structure to which the fiber optic connectors 1012 and the fibers themselves can be added later. Many configurations of manifolds 1010 can be created this way using the stackable branch offs and various lengths of tubing. The result can be viewed as analogous to a custom made wiring harness with a tree and branch structure, except that it is a tubular harness to which the fiber is added and thereby may be contained and protected. The fully assembled manifold 1010 containing the fibers and the connectors 1012 (shown as Optitap connectors in FIG. 10) may then be attached to the distribution manifold 1015 or otherwise coupled to a fiber optic cable.

A cover for the splice/splitter closure 1025 may be used to enclose the splicing area, thereby allowing the entire splice/splitter region to be covered by an outer mechanical sealed device. The cover may be a separate piece, or a section of the closure 1025, which hinges, slides, and/or folds over an opening to the splice/splitter region. In the embodiments of FIG. 10, the outer sealing may be achieved by using heat shrink tubing with hot melt adhesive inside the tubing. When shrunk, this may provide sealing, strain relief, and/or mechanical durability for the finished product. It also may seal the splice/splitter region from the annular space within the drop cable itself. The outer sealing function can also be achieved by using a mechanical closure other than heat shrink tubing, such as a rigid or semi-rigid closure using two half shell structures providing similar sealing and strain relief for the cable and the semi rigid device inside.

A further configuration of optical terminal is illustrated in the perspective view of FIG. 11. In the embodiments of FIG. 11, two connectors 1112 are coupled to a splice/splitter closure 1125 through respective protective tubes 1140 with optical fibers coupled to the connectors 1112 extending therein. A splitter may be provided in the splice/splitter closure 1125 to couple the optical fibers from the connectors 1112 to a single optical fiber extending from the splice/splitter closure 1125 through a protective tube 1150. The optical fiber in the protective tube 1150 may be coupled, by a connector or splice, to a distribution closure or the like to couple the connectors 1112 to a central office. Overmolding may be provided to cover the splice/splitter closure. Such overmolding may also be extended to cover the protective tubes 1114 and the juncture between the tubes 1114 and receptacle portions 1142 configured to receive the connectors 1112.

Further embodiments of the present invention will now be described with reference to FIG. 12. FIG. 12 is a perspective view of a multitap optical fiber terminal 1200 that may be used as a fiber tap-off point on a fiber cable that may feed a street, or small neighborhood or the like. The configuration of the optical fiber terminal 1200 shown in FIG. 12 may be implemented with a small fiber count cable 1205 extending from a terminal housing 1210, including a single fiber cable feeding into a splitter included in the terminal housing 1210.

The cable 1205 may include a protective layer and an optical fiber, which may be coupled to an optical connector 1207 at an end of the cable 1205 remote from the terminal housing 1210. The splitter may be positioned in a first compartment in the terminal housing 1210 and tap-off point connectors 1225 may be positioned to extend into a second connector compartment or compartments in a main body 1211 of the terminal housing 1210. The connectors 1225 may be positioned in respective connector receiving extensions 1220 of the main body 1211. In the respective connector compartment(s), the fibers may be attached to a backside connector of the connectors 1225 by a fusion splice, a mechanical splice, or a connector, such as an SC and/or FC connector and/or other connection means. The first or main compartment, where the incoming single fiber is split into separate fibers to couple to respective connectors 1225, and the connection compartment(s) may be environmentally isolated from one another by sealing means inside the main body 1211. In such embodiments, in the event that one of the compartments is flooded or otherwise subjected to environmental contamination, the others may not be affected. In addition, a cover 1230 may be provided on the respective connectors 1225 to provide for sealing of the respective compartment associated with a particular connector 1225 when the connector 1225 is not in use.

A cover 1213 of the terminal housing 1210 in some embodiments is round and is removably attached, by screws or the like, to the main body 1211. The main body 1211 is shown as having a shape similar to a large diameter bottlecap in the embodiments of FIG. 12. In some embodiments, screw threads or the like are provided on an outer circumference of the cover 1213, which mate with corresponding threads on an inner surface of the main body 1211. In other embodiments, screw threads or the like may be provided on an inner surface of the cover 1213 and the cover 1213 may be screwed over corresponding threads on an outer surface of the main body 1211. In some embodiments, the motion related to attaching the cover 1213 to the main body 1211 may be implemented without requiring rotation of the main body 1211 as the cables extending therein may make such rotational movement prohibitive. This arrangement may enable a simple, reliable method of sealing the cover 1213 to the main body 1211. Other closure products generally use non-round shapes that generally cannot be readily screwed in this manner and, consequently, typically need complex bolts, gaskets etc. and may form less reliable seals.

In some embodiments, the terminal housing 1210 has an angled entry/exit point 1215 for the cable 1205. The entry/exit point 1215 may be generally round in shape, such that the assembled cable and enclosure can be more readily coiled inside a round handhole.

Some embodiments of the present invention provide a hybrid design with aspects included from two currently deployed passive optical network (PON) architectures to provide potential benefits not all available from such PON distributed splitter networks and centralized splitter networks. These combinations of potential benefits in some embodiments of the present invention may be provided by changing the current centralized splitter cabinet (such as a CSX-2 available from Tyco Electronics Corporation) from a subscriber based system (with each port representing one subscriber "S") into a terminal based system (with each port representing one terminal "T"). The terminal based system may allow a technician to activate a terminal from the cabinet by plugging in one single fiber connector. The terminal typically represents 4 or 8 (but could be 2 through 32 or more) customers at one remote location.

Some embodiments of the present invention utilize currently available products and technologies without the need to rely on complex and unproven (in the outside plant (OSP)) multifiber connector solutions.

Several problems may be overcome by various embodiments of the present invention, including network scalability via the flexibility to add/remove/upgrade terminals (with splitters) to serve differing subscriber bases that change over time, delayed deployment of terminals and splitters resulting in deferred material costs, reduction of connectors and adapters in the centralized splitter cabinet resulting in reduced cabinet size and costs, reduction of distribution fibers in the network resulting in reduced cable costs and associated maintenance (cable cut restoration is simplified). Some embodiments of the present invention may utilize smaller and/or lower priced splitters in the cabinet.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A terminal for connecting customers to an optical fiber network, the terminal comprising:
   a terminal housing;
   an optical fiber splitter in the housing;
   an optical fiber cable stub extending from the housing, the optical fiber cable stub having an optical fiber extending therein and coupled to the splitter in the housing;
   a plurality of termination connectors connected to the housing, ones of the termination connectors having a customer optical fiber connection point accessible from outside the terminal housing and respective optical fibers extending in the housing from the termination connectors to the splitter;
   wherein the splitter is configured to couple the optical fiber from the optical fiber cable stub to the optical fibers extending from the termination connectors to couple a single optical fiber from the optical fiber cable stub to a plurality of customer optical fiber connection points.

2. The terminal of claim 1 wherein the optical fiber cable stub further comprises a termination connector on an end thereof removed from the terminal housing, the termination connector being configured to optically couple the optical fiber extending in the optical fiber cable stub to the optical fiber network.

3. The terminal of claim 2 wherein the termination connector is configured to connect the optical fiber extending in the optical fiber cable stub to a distribution closure of the optical fiber network.

4. The terminal of claim 2 wherein the optical fiber cable stub includes only a single optical fiber extending therein.

5. The terminal of claim 1 wherein the respective customer optical fiber connection points comprise an end of the termination connectors extending from the termination housing and being configured to couple to an individual customer premise line to provide service to a customer.

6. The terminal of claim 1 wherein the terminal housing comprises an environmentally sealed housing and wherein the ends of the termination connectors extending from the housing include a seal member that seals the termination connector when a customer premise line is not coupled thereto and wherein the ends of the termination connectors extending from the housing are configured to sealingly couple to a customer premise line coupled thereto to maintain environmental sealing of the housing.

7. The terminal of claim 1 wherein the plurality of termination connectors comprises four and/or eight termination connectors, each of which is coupled to a single optical fiber extending in the optical fiber cable stub.

8. The terminal of claim 1 wherein the optical splitter comprises a non-symmetrical splitter and wherein one of the termination connectors comprises a pass through port having an optical fiber extending therefrom to the splitter configured to carry a plurality of customer signals.

9. The terminal of claim 8 further comprising an additional terminal having its optical fiber cable stub coupled to the pass through port.

10. An optical fiber distribution system, comprising:
  means for selectively changing a number of optical ports for connecting to customer premises coupled to a single fiber extending to a distribution closure; and
  at least one optical fiber of the optical fiber distribution system extending to the distribution closure.

11. The system of claim 10, further comprising means for changing a portion of a capacity of at least one fiber extending from a central office of the optical fiber distribution system allocated to the single fiber extending to the distribution closure based on the changed number of optical ports.

12. The system of claim 11 wherein the means for changing a portion of a capacity of at least one fiber comprises an optical splitter cabinet including a splitter and/or a non-symmetric splitter.

13. The system of claim 10 wherein the means for selectively changing a number of optical ports includes a terminal having a splitter therein configured to couple a plurality of customer connection points of the terminal to a single optical fiber having an end configured to be coupled to the distribution closure.

14. The system of claim 13 wherein the means for selectively changing a number of optical ports further includes an optical splitter cabinet having a connector field for selectively coupling the single fiber extending to the distribution closure to a fiber extending from the optical splitter cabinet to a central office of the optical fiber distribution system.

15. A terminal for connecting customers to an optical fiber network, the terminal comprising:
  a terminal housing;
  an optical fiber splitter in the housing;
  an optical fiber cable connector member extending from the housing and having a network termination connector on an end thereof removed from the terminal housing that is configured to optically couple to the optical fiber network, the optical fiber cable connector member having an optical fiber extending therein that couples the network termination connector to the splitter in the housing;
  a plurality of customer termination connectors connected to the housing, ones of the customer termination connectors having a customer optical fiber connection point accessible from outside the terminal housing and respective optical fibers extending in the housing from the customer termination connectors to the splitter;
  wherein the splitter is configured to couple the optical fiber from the network termination connector to the optical fibers extending from the customer termination connectors to couple a single optical fiber from the network termination connector to a plurality of customer optical fiber connection points.

16. The terminal of claim 15 wherein the terminal housing comprises an environmentally sealed housing and wherein the ends of the customer termination connectors extending from the housing include a seal member that seals the customer termination connector when a customer premise line is not coupled thereto and wherein the ends of the customer termination connectors extending from the housing are configured to sealingly couple to a customer premise line coupled thereto to maintain environmental sealing of the housing.

17. The terminal of claim 1 wherein the respective optical fibers extending from the termination connectors are coupled to an output side of the optical fiber splitter and the optical fiber from the optical fiber cable stub is coupled to an input side of the optical fiber splitter.

18. The terminal of claim 1 wherein the optical fiber splitter is entirely contained within the terminal housing.

19. The terminal of claim 1 wherein the termination connectors are connected to a side of the terminal housing displaced from a side of the terminal housing having the optical fiber cable stub extending therefrom.

20. The terminal of claim 1 wherein the respective optical fibers extending from the termination connectors extend flexibly and independently from the termination connectors to an output side of the optical fiber splitter.

21. The terminal of claim 15 wherein the respective optical fibers extending from the customer termination connectors are coupled to an output side of the splitter and the optical fiber from the network termination connector is coupled to an input side of the splitter.

22. The terminal of claim 15 wherein the optical fiber splitter is entirely contained within the terminal housing.

23. The terminal of claim 15 wherein the customer termination connectors are connected to a side of the terminal housing displaced from a side of the terminal housing having the optical fiber cable connector member extending therefrom.

24. The terminal of claim 1 wherein the respective optical fibers extending from the customer termination connectors extend flexibly and independently from the customer termination connectors to an output side of the optical fiber splitter.

* * * * *